F. D. HAYWARD.
MOLD FOR VULCANIZING ARTICLES OF INDIA RUBBER.

No. 30,787. Patented Nov. 27, 1860.

Witnesses:
Edmund Masson
Thos. R. Roach

Inventor:
F. D. Hayward

UNITED STATES PATENT OFFICE.

FRANCIS D. HAYWARD, OF MALDEN, MASSACHUSETTS, ASSIGNOR TO HIMSELF AND DANL. E. HAYWARD, OF MALDEN, MASSACHUSETTS.

MODE OF HOLDING SOCKETS OF MOLDS DURING VULCANIZATION OF CAOUTCHOUC.

Specification of Letters Patent No. 30,787, dated November 27, 1860.

*To all whom it may concern:*

Be it known that I, FRANCIS D. HAYWARD, of Malden, in the county of Middlesex and State of Massachusetts, have invented certain new and useful Improvements in Molds for Vulcanizing Articles of India-Rubber, of which the following is a full, clear, and exact description, reference being had to the accompanying drawings, making part of this specification, in which—

Figure 3:
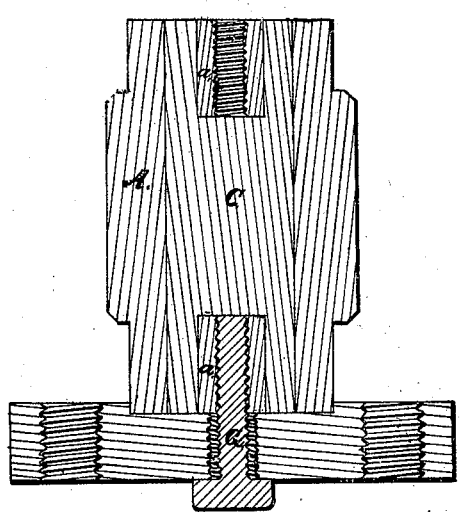
Figure 2:
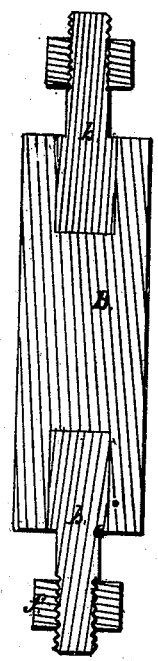
Figure 1:
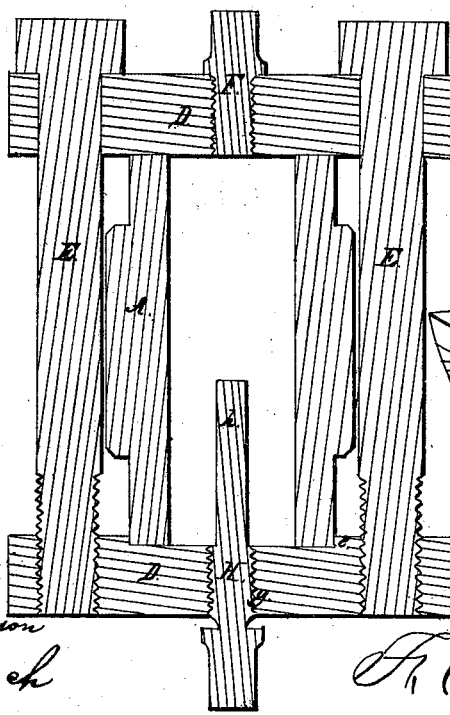
Figure 4:
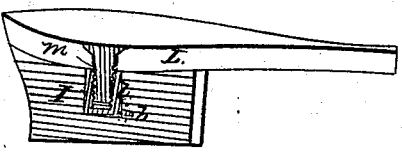

Figure 1 is a longitudinal section through an iron mold, suitable for vulcanizing a cylinder of rubber such as is represented in section in Fig. 2. Fig. 3 is a section through part of the mold and a cylinder of rubber contained within it. Fig. 4, is a section through a vulcanized rubber heel and part of the sole of a boot.

In molding and vulcanizing articles of india rubber, it is often required to secure a piece of metal in the rubber—for example to secure a socket $a$, Fig. 3, for the reception of a screw, or a screw bolt $b$, Fig. 2, to be used in attaching the rubber to some other article; in such cases it is necessary that the socket or other piece of metal shall be held securely in its place in the mold while the plastic rubber is being compressed around it, and afterward while the rubber is being vulcanized.

My present invention consists in a convenient method of holding the piece of metal around which the rubber is to be vulcanized, securely in place in the mold during the molding and vulcanizing of the rubber.

That others skilled in the art may understand and use my invention I will proceed to describe the manner in which I have carried out the same.

In the said drawings the iron mold is composed of several parts, a hollow cylinder A suited to contain the solid cylindrical piece of rubber B, Fig. 2, or the piece C, Fig. 3. At each end of the cylinder A, is a cap or plate D, or D′, of greater diameter than the cylinder, screw bolts E, pass through the cap D, and screw into the cap D′, outside of the cylinder A. These bolts are for holding the whole mold together after the plastic rubber has been forced into it by a suitable press, and during the process of vulcanizing.

Each cap D, D′ has a hole with a female screw in it immediately over the center of the cylinder A. When not otherwise occupied this hole is filled with a tap F. The end of the cylinder A, fits in a recess $c$, turned out in the cap D′ which keeps the cylinder central to the caps. To mold the cylindrical piece C, Fig. 3, with a socket $a$ of brass or other metal in each end of it, the mold is taken apart by removing the screw bolts E, the taps F are removed, and a screw bolt G is passed through the hole in the cap. This bolt is slightly smaller than the hole in the cap, and has a screw cut on it which fits the female screw in the socket $a$, into which it is screwed and the socket is drawn down tight against the cap. The cylinder A, is now placed upon the cap D′ and the plastic rubber compound is forced into the mold, filling the mold around the lower socket $a$, which projects up into the mold. The cap D with the other socket $a$, projecting from it is now put on, and as the screw bolts E draw the caps together this socket is forced down into the rubber, which is now vulcanized in the mold in the usual manner.

To secure the screw bolt $b$ Fig. 2 in the mold, the bolt which has a shoulder at $e$ is passed through the hole in the cap D or D′ and a nut $f$ is used to draw it tight against the cap.

If a socket like $a$ which has a smooth hole through it instead of a screw, is to be held in the mold, a tap H, Fig. 1, is used. It has a screw $g$ to turn into the hole in the cap, but its upper part $h$ is plain.

I have used the above described mold as an illustration of my method of holding the metal sockets in the mold, but it is evident that almost any article may be molded and vulcanized in a similar manner. For example in Fig. 4, is shown the heel I, of a boot, which has been molded and vulcanized around a socket $l$. In this case the socket has a projecting lip $i$ which is embedded in the rubber. This socket is intended to receive a screw *m*, which secures the heel to the sole L of the boot.

What I claim as my invention and desire to secure by Letters Patent is—

5   The method herein above described of holding the metal socket or other article around which the rubber is to be molded and vulcanized securely in the mold, as set forth.

F. D. HAYWARD.

Witnesses:
  E. S. CENURSE,
  JOHN ROBSON.